United States Patent [19]

Shimaoka et al.

[11] Patent Number: 4,654,734
[45] Date of Patent: Mar. 31, 1987

[54] MAGNETIC DISK DRIVE

[75] Inventors: Motohiro Shimaoka; Makoto Watanabe, both of Furukawa, Japan

[73] Assignee: Alps Electric Co., Ltd., Japan

[21] Appl. No.: 822,922

[22] Filed: Jan. 24, 1986

Related U.S. Application Data

[63] Continuation of Ser. No. 471,792, Mar. 2, 1983, abandoned.

[30] Foreign Application Priority Data

Mar. 3, 1982 [JP] Japan .................................. 57-33699

[51] Int. Cl.⁴ .............................................. G11B 5/016
[52] U.S. Cl. ...................................................... 360/99
[58] Field of Search .................................. 360/97–99, 360/96.5, 96.6

[56] References Cited

U.S. PATENT DOCUMENTS

| | | | |
|---|---|---|---|
| 3,890,643 | 6/1975 | Dalziel | 360/99 |
| 4,024,581 | 5/1977 | Lesca | 360/99 |
| 4,139,876 | 2/1979 | Owens | 360/97 |
| 4,194,224 | 3/1980 | Grapes | 360/97 |
| 4,205,355 | 5/1980 | Hamanaka | 360/99 |
| 4,415,940 | 11/1983 | Becker | 360/99 |
| 4,466,033 | 8/1984 | Jordan | 360/99 |

OTHER PUBLICATIONS

Xerox Discl. Journ., vol. 4, #2, Mar./Apr. 1979, pp. 275-276; R. Townsend; Ejection Feature 1 mp. for a Floppy Disc.

Primary Examiner—A. J. Heinz
Attorney, Agent, or Firm—Guy W. Shoup

[57] ABSTRACT

A magnetic disk drive assembly has an ejector pivotably mounted on a base for movement between a locked position and an unlocked position, the ejector being normally spring-biased toward the unlocked position. When a diskette is fully inserted into the magnetic disk drive assembly, the ejector is displaced by the diskette into the locked position. A locking projection is mounted on the base for locking the ejector in the locked position. A hub frame pivotably mounted on the base supports a lock release member resiliently engageable with the ejector when the latter is in the locked position and also when the hub frame is in a drive position. When the hub frame is moved from the drive position to a non-drive position, the lock release member allows the ejector to be released from the locked position to the unlocked position and also released from the lock release member.

6 Claims, 8 Drawing Figures

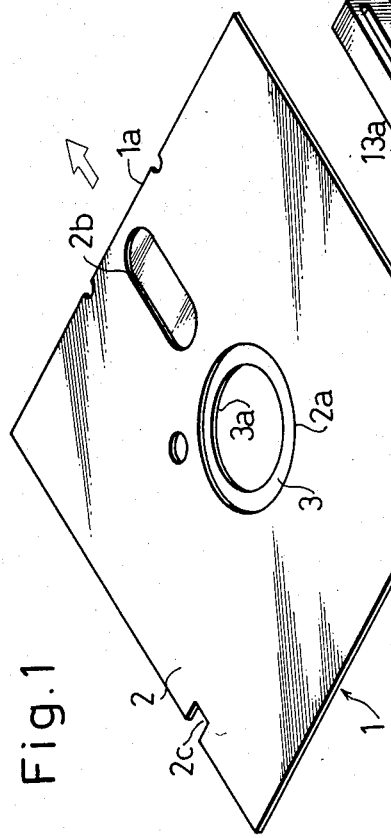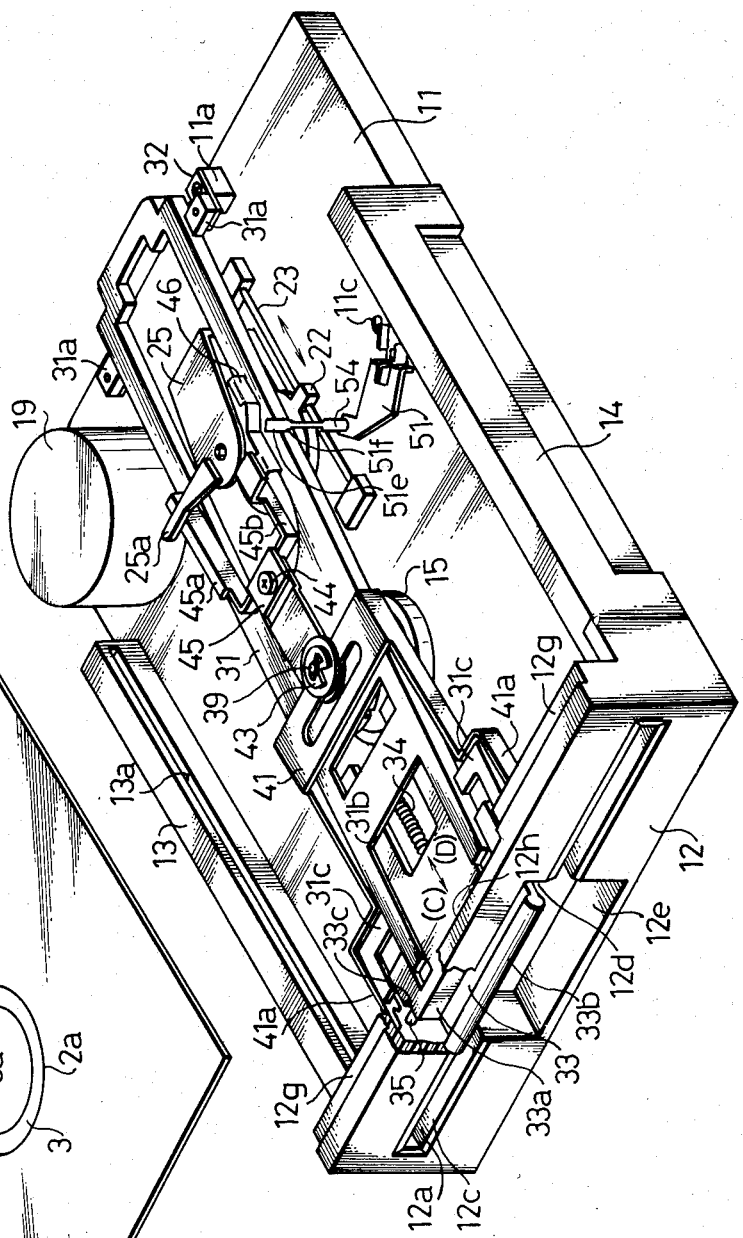

MAGNETIC DISK DRIVE

This is a continuation application from application Ser. No. 471,792 filed Mar. 2, 1983 now abandoned.

BACKGROUND OF THE INVENTION

The present invention relates to a magnetic disk drive assembly for writing information into and reading information out of a flexible magnetic disk known as a floppy disk or diskette, and more particularly to a magnetic disk drive assembly capable of ejecting a diskette easily out therefrom.

To allow removal of a diskette out of the drive position, conventional magnetic disk drive assemblies often have separate mechanisms respectively for releasing a hub clamp which holds a diskette and then ejecting the diskette. Therefore, the prior disk ejection procedure has required two distinct steps of operation to be performed on the magnetic disk drive unit, a process which is tedious and time-consuming. Attempts to release the hub clamp and eject the diskette in synchronism often require a complex mechanism that takes up a relatively wide space and thus it is difficult to provide such a mechanism in the thin or low-profile magnetic disk drive units coming into increasing use.

SUMMARY OF THE INVENTION

It is an object of the present invention to provide a magnetic disk drive assembly which will eliminate the foregoing prior difficulties.

Another object of the present invention is to provide a magnetic disk drive assembly having a simple mechanism for releasing a hub clamp and ejecting a diskette.

According to the present invention, a magnetic disk drive assembly comprises an ejector movably mounted on a base for movement between an unlocked position in a path of movement of a diskette and a locked position out of the path of movement, the ejector being normally spring-biased into the unlocked position and engageable with a leading edge of a diskette. A locking projection is mounted on the base for locking the ejector in the locked position when the ejector is engaged by the leading edge of a diskette which is fully inserted in the drive assembly, and a lock release mechanism is mounted on a hub frame and engageable with the ejector in the locked position when the hub frame is in a drive position. The ejector can be released from the locked position toward the unlocked position by the lock release mechanism when the hub frame is moved from the drive position to a non-drive position.

Since the ejector is locked only when the diskette is fully inserted, the diskette will be forced out through an insertion slot if not inserted properly. This prevents the diskette from being inserted in error and hence from being damaged. The ejector can be unlocked by lifting the hub frame, thereby allowing the diskette to pop out to a position in which the diskette can easily be taken out manually. Therefore, a hub clamp which has clamped the diskette in position in the drive assembly can be released and the diskette can be ejected simultaneously in a single operation. The ejector is unlocked by the lock release member when the latter moves with the hub frame to its non-drive position. The drive assembly has a low-profile configuration as its height is basically governed by an angular interval through which the hub frame moves between the drive and non-drive positions. The ejector can be locked by the locking projection which is quite simple and takes up only a small space. The lock release member is in the form of a leaf spring which can reliably held in fitting engagement with the ejector.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a perspective view of a diskette;

FIG. 2 is a perspective view of a magnetic disk drive assembly according to the present invention;

DESCRIPTION OF THE PREFERRED EMBODIMENT

Figure 3A:
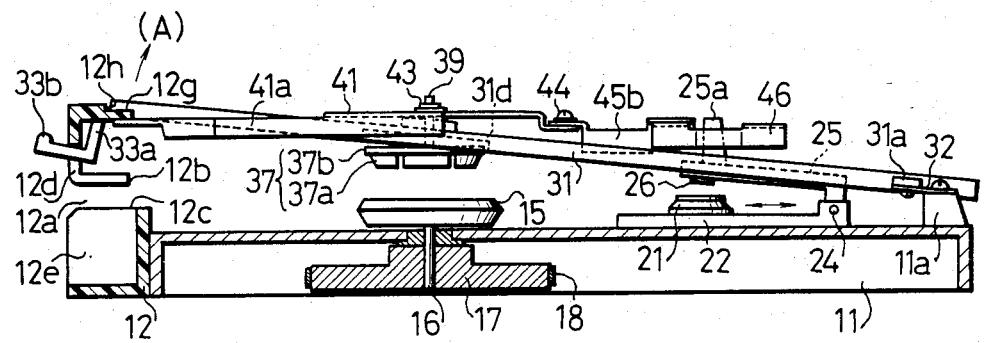
FIG. 3(A) is a cross-sectional view of the magnetic disk drive assembly of FIG. 2 with parts shown in a non-drive position.

As shown in FIG. 1, a floppy disk or diskette 1 comprises a jacket 2 of paper or plastic material and a storage medium or magnetic disk 3 enclosed in the jacket 2. The jacket 2 has a central opening 2a and a head slot 2b positioned laterally of the central opening 2a with the storage medium 3 being exposed through the central opening 2a and the head slot 2b. The storage medium 3 has a sector hole 3a in its center exposed through the central hole 2a for holding and rotating the storage medium 3. A magnetic recording and pickup head can be held against the portion of the storage medium 3 which is exposed through the head slot 2b. The jacket 2 has a notch 2c in a side edge thereof for being detected by an optical detector means. When the notch 2c is covered with a tape or the like, the storage medium 3 is protected against writing of new information therein.

A magnetic disk drive assembly as illustrated in FIG. 2 comprises a base 11 die-cast of aluminum having a front panel 12 of synthetic resin attached to one end of the base 11 and a pair of side panels 13, 14 of synthetic resin mounted on the base 11 at opposite ends of the front panel 12. The front panel 12 has an insertion slot 12a, and the side panels 13, 14 have respective guide grooves 13a (only one shown) in their inner surfaces, the guide grooves 13a jointly providing a guideway for the diskette 1. When the diskette 1 is to be inserted into the magnetic disk drive assembly, the diskette 1 is pushed with a front edge 1a leading the way into the insertion slot 12a while side edges of the diskette 1 slide in the guide grooves 13a, respectively, until the diskette 1 is fully inserted.

A spindle 15 is mounted on the base 11 at a central position of the guideway provided by the guide grooves 13a. The spindle 15 has a substantially flat top with a concave center, and a shaft 16 extends downwardly through the base 11. A flywheel 17 is secured to a lower end of the shaft 16 as shown in FIG. 3(A). An endless belt 18 is trained around the flywheel 17 and a shaft of a motor 19 (FIG. 2) mounted on the base 11. Therefore, when the motor 19 is energized, it causes the flywheel 17 and the spindle 15 to rotate through the endless belt 18.

As illustrated in FIG. 3(A), a magnetic recording and pickup head 21 is fixed to a head base or carriage 22 movable along a guide rail 23 mounted on the base 11. The head in directions toward and away from the spindle 15. The head base 22 is movable by a stepping motor (not shown) disposed below the base 11 so as to be driven back and forth along the guide rail 23 in a direction toward or away from the spindle 15. A pad arm 25 is pivotably supported at one end thereof by a pin 24 on an end of the head base 22 and has on the other end a pad 26 facing downwardly for pressing the storage medium 3 against the magnetic head 21. The pad arm 25 is normally urged by a spring (not shown) in a direction to be pressed against the magnetic head 21. When the magnetic disk drive assembly is in a non-drive position as for loading the diskette 1, the pad arm 25 is lifted by a mechanism (described later) in a direction away from the magnetic head 21.

A hub frame 31 is mounted on and disposed over the base 11, the hub frame 31 being die-cast of aluminum. The hub frame 31 has a pair of support arms 31a on its righthand end as shown in FIG. 2. The base 11 has a pair of projections 22a to which the support arms 31a are coupled, respectively, by leaf springs 32 that are bent beforehand to normally bias the hub frame 31 under the resiliency of the leaf springs 32 in a direction to raise a lefthand end (as shown) of the hub frame 31 in the direction of the arrow A (FIG. 3(A)). The lefthand end of the hub frame 31 has a recess 31b as shown in FIG. 2 and a pair of guide arms 31c extending laterally of the hub frame 31. An actuator 33 of synthetic resin is attached to the lefthand end of the hub frame 31. The actuator 33 is slidably guided in the recess 31b and by inner edges of the guide arms 31c for slidable back-and-forth movement in the directions of the arrows C and D. There is a spring 34 acting between the actuator 33 and an opposite edge of the recess 31b for normally urging the actuator 33 to move toward the front panel 12 in the direction of the arrow C. The actuator 33 includes a front bent portion 33a extending downwardly at a right angle and having on its lower end a finger grip 33b projecting forwardly. The actuator 33 also has a pair of side stopper steps 33c and a pair of pins 35 located in front of the side stopper steps 33c and projecting away from each other. The front panel 12 has a pair of upper and lower guide surfaces 12b, 12c (FIG. 3(A)) above and below, respectively, the insertion slot 12a. The front panel 12 also has an upper recess 12d and a lower cavity 12e defined at a central portion of the insertion slot 12a and facing across the latter. The finger grip 33b of the actuator 33 is vertically (as shown) movable in the recess 12d and the cavity 12e. The cavity 12e serves as a space for insertion therein of a finger for actuating the finger grip 33b. The front panel 12 also includes a guide rib 12f as shown in FIG. 4 but omitted from illustration in FIGS. 2, 3(A) and 3(B), the guide rib 12f extending vertically.

Figure 3B:
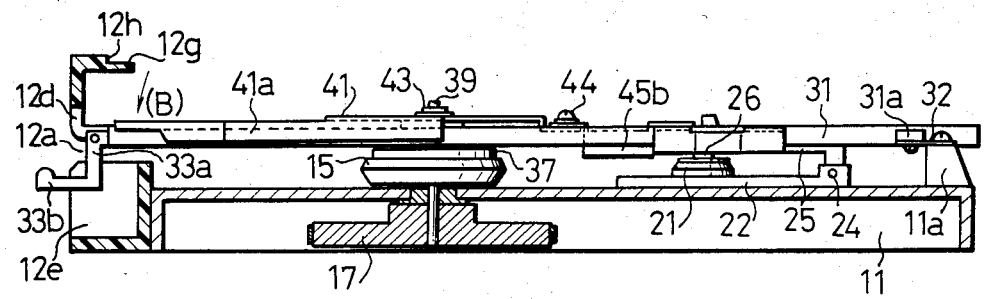
FIG. 3(B) is a cross-sectional view of the magnetic disk drive assembly of FIG. 2 with parts shown in a drive position.
Figure 4:
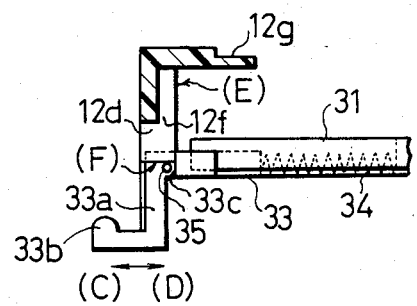
FIG. 4 is an enlarged cross-sectional view of an actuator as it is locked.

When the hub frame 31 is swung in the direction of the arrow B (FIG. 3(B)) against the force of the leaf springs 32, the hub frame 31 can be locked in the position of FIG. 3(B). As shown in more detail in FIG. 4, when the hub frame 31 is lowered, the actuator 33 projects in the direction of the arrow C under the resiliency of the spring 34 until the lateral pins 35 on the actuator 33 are engaged by a lower edge of the guide rib 12f. At the same time, the steps 33c behind the pins 35 are held against an inner edge E of the guide rib 12f, thus preventing further projecting movement of the actuator 33 in the direction of the arrow C. With the pins 35 engaged by the lower edge F of the guide rib 12f, the hub frame 31 is locked down against upward pivotable movement in the direction of the arrow A (FIG. 3(A)). When the finger grip 33b of the actuator 33 is pushed in the direction of the arrow D in the locked position of FIG. 4, the pins 35 are disengaged from the lower edge F of the guide rib 12f, whereupon the hub frame 31 is turned upwardly in the direction of the arrow A under the bias of the leaf springs 32. Such upward movement of the hub frame 31 is stopped when the finger grip 33b is brought into abutment against an upper edge of the recess 12d in the front panel 12 as shown in FIG. 3(A) with the lateral pins 35 held in contact with the inner edge E of the guide rib 12f.

The hub frame 31 supports on its central portion a hub clamp 37 of synthetic resin directed downwardly and having a plurality of resiliently deformable lower pressers 37a and a flange 37b on which the pressers 37a are mounted. An auxiliary frame 41 of pressed metal sheet is placed on an upper surface of the hub frame 31. A shaft 39 extends centrally through the hub frame 31 and has an upper end projecting beyond an upper surface of the auxiliary frame 41. The auxiliary frame 41 is retained on the hub frame 31 by a retaining ring 43 attached to the upper end of the shaft 39. The hub clamp 37 is rotatably supported on a lower end of the shaft 39 by a bearing (not shown), for example. Although not shown, the hub clamp 37 is resiently biased downwardly under the force of a compression spring located within the hub clamp 37 urging the hub clamp 37 away from the hub frame 31. When the magnetic disk drive assembly is in the drive position as shown in FIG. 3(B) in which the diskette 1 is placed in position, the pressers 37a of the hub clamp 37 are resiliently held against an inner wall of the central recess in the spingle 15 with the storage medium 3 clamped between the flange 37b of the hub clamp 37 and the spindle 15. When the spindle 15 rotates about its own axis, the storage medium 3 and the hub clamp 37 rotate together. Since the auxiliary frame 41 is simply placed on the hub frame 31 and retained thereon by the retaining ring 43, the auxiliary frame 41 is held against the upper surface of the hub frame 31 under the resiliency of the non-illustrated coil spring acting between the hub clamp 37 and the hub frame 31 in the position of FIG. 3(B). In the position of FIG. 3(A), the auxiliary frame 41 is kept inclined with respect to the upper surface of the hub frame 31 as described later on. At this time, the coil spring interposed between the hub clamp 37 and the hub frame 31 is compressed with the shaft 39 projecting above the hub frame 31. The shaft 39 and the hub clamp 37 are also tilted with respect to the hub frame 31, and the hub clamp 37 remains generally parallel to the spindle 15 and has a righthand end (as shown) fitted in a recess 31d defined in a lower surface of the hub frame 31 as illustrated in FIG. 3(A).

The auxiliary frame 41 has on its lefthand end a pair of crank-shaped lateral arms 41a having distal ends extending outwardly of the guide arms 31c of the hub frame 31 and disposed below a stopper rib 12g formed on an upper end portion of the front panel 12. To the righthand end of the auxiliary frame 41, there is secured by a screw 44 the base of a U-shaped actuation member 45 having a pair of arms 45a, 45b. The arm 45a is held at its upper surface against an engagement arm 25a mounted on the pad arm 25. The other arm 45b has a lock release member 46 in the form of a thin bent leaf spring.

Figure 5A:
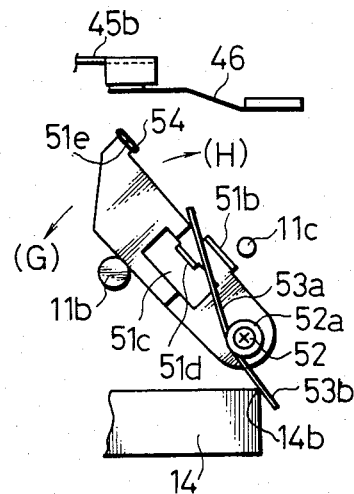
FIG. 5(A) is a fragmentary plan view of an ejector positioned with no diskette inserted in place.
Figure 5B:
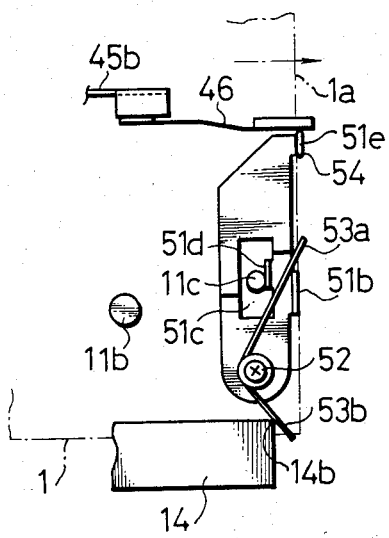
FIG. 5(B) is a fragmentary plan view of the ejector located with a diskette inserted in a drive position.
Figure 5C:
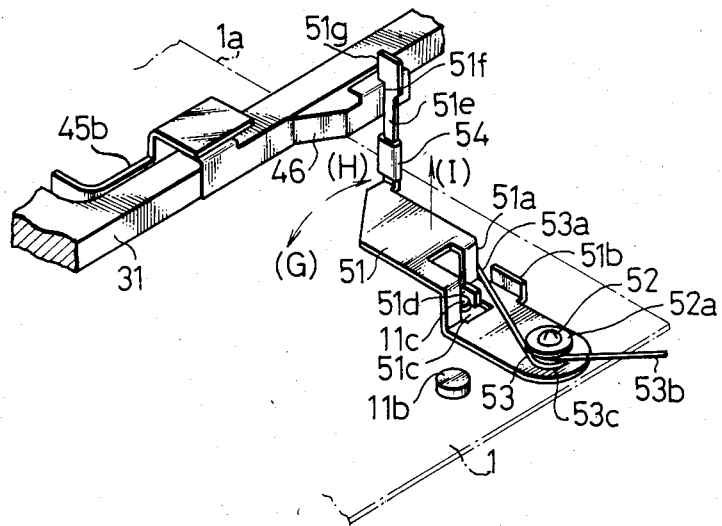
FIG. 5(C) is a perspective view of the ejector positioned while the inserted diskette is being driven.

An ejector 51 is mounted on an upper surface of the base 11 for angular movement about a support pin 52 affixed to the base 11 in the directions of the arrows G and H along the base 11 as illustrated in FIGS. 5(A) through 5(C). A torsion spring 53 has a coil 53c disposed around the support pin 52, an arm 53a engaging a righthand edge (as shown) of the ejector, and another arm 53b engaging an edge 14b of the side panel 15. Accordingly, the ejector 51 is normally urged in the direction of the arrow G under the bias of the torsion spring 53. When the ejector 51 is angularly moved in the direction of the arrow G, a lefthand end of the ejector 51 engages a stopper 11b projecting from the base 11 as shown in FIG. 5(A). The coil 53c of the torsion spring 53 is composed of turns or convolutions which are mutually spaced in their free state, but are interposed in a state of compression between an upper flange 52a of the support pin 52 and the ejector 51 to thereby bias the ejector 51 to be pressed against the base 11. The coil 53c as it is interposed between the upper flange 52a and the ejector 51 is further compressible, so that the ejector 51 can slightly be lifted away from the base 11 in the direction of the arrow I (FIG. 5(C)). The ejector 51 has a foot portion normally held against the base 11 and including a righthand bent flange 51b. The foot portion of the ejector 51 also has a central hole 51c and a bent flange 51d disposed at a righthand edge of the central hole 51c. The base 11 has a locking projection 11c positioned in the path of movement of the bent flanges 51b, 51d of the ejector 51. The ejector 51 has on its distal end a bent bar 51e extending upwardly and having a protective strip 54 wound around a proximal end thereof. The protective strip 54 is made of rubber, for example, for protecting the diskette 1 against damage when the front edge 1a thereof hits the proximal end of the bent bar 51e. The bent bar 51e also has a lateral recess 51f in which the lock release member 46 can engage.

Operation of the magnetic disk drive assembly thus constructed is as follows:

FIG. 3(A) shows the parts of the magnetic disk drive assembly in the non-drive position. The hub frame 31 is raised in the direction of the arrow A under the resilient force of the righthand leaf springs 32. The hub clamp 37 disposed on the underside of the hum frame 31 is spaced upwardly from the spindle 15 on the base 11, but held generally parallel thereto. With the hub frame 31 thus lifted, the lefthand end of the hub frame 31 projects upwardly through a recess 12d defined in the front panel 12, while the distal end of the lefthand arm 41a of the auxiliary frame 41 abuts against the lower surface of the stopper rib 12g of the front panel 12. Since the distal end of the arm 41a is restrained in its motion by the stopper rib 12g, the auxiliary frame 41 turns counterclockwise with respect to the hub frame 31 which is lifted. As the hub frame 31 continues to move upwardly the shaft 39 supporting the auxiliary frame 41 moves upwardly to project from the hub frame 31 while causing the coil spring between the hub clamp 37 and the hub frame 31 to be compressed, and the auxiliary frame 41 is inclined with respect to the hub frame 31. Therefore, as shown in FIG. 3(A), the auxiliary frame 41 is kept substantially horizontal while the hub frame 31 is tilted with its lefthand end up. At this time, the actuation member 45 affixed to the righthand end of the auxiliary frame 41 is elevated above the hub frame 31 disposed therebelow. Since the engagement arm 25a of the pad arm 25 is engaged by the arm 45a of the actuation member 45, the pad arm 25 is also angularly moved upwardly about the pin 24 as shown in FIG. 3(A). The pad 26 mounted on the pad arm 25 is thus spaced appreciably from the magnetic head 21. In the non-drive position, as shown in FIG. 5(A), the ejector 51 is angularly moved in the direction of the arrow G until it is held against the stopper 11b. At this time, the bent bar 51e with the protective strip 54 thereon is positioned in the path of travel defined by the guide grooves 13a for the diskette 1.

The diskette 1 is then inserted into the magnetic disk drive assembly in the position of FIG. 3(A). The diskette 1 is pushed with the front edge 1a leading the way into the insertion slot 12a while the lateral edges of the diskette 1 sliding along the guide slots 13a. When the diskette 1 is inserted to a certain depth into the drive assembly, the front edge 1a of the diskette 1 is brought into abutment against the protective strip 54 of the ejector 41. Continued insertion of the diskette 1 causes the ejector 51 to swing about the screw 52 against the resiliency of the spring 53. If the diskette 1 while being inserted were released of manual presure, the diskette 1 would be forced back out of the insertion slot 12a by the ejector 51 under the force of the spring 53. Stated otherwise, the diskette 1 will forcibly be pushed back out when released unless and until the diskette 1 is fully inserted into the drive position as described below. This prevents the diskette 1 from being placed erroneously in the drive assembly. As the diskette 1 is pushed further into the drive assembly, the bent flange 51b of the ejector 51 hits the locking projection 11c on the base 11. Since the ejector 51 can be elevated in the direction of the arrow I while causing the coil 53c of the spring 53 to be compressed, a lower edge of the bent flange 51b rides over the locking projection 11c. When the diskette 1 is pushed to a further depth, the hole 51c in the ejector 51 is positioned around the locking projection 11c, which is completely held within the hole 51c since the ejector 51 is pressed against the base 11 under the bias of the coil 53c of the spring 53. The ejector 51 is now locked by the locking projection 11c; the ejector 51 is prevented from going back in the direction of the arrow G because the bent flange 51d of the ejector 51 will be held against by the locking projection 11c. At this time, a lateral edge 51g (FIG. 5(C)) at an uppermost portion of the bent bar 51e and above the recess 51f is held in engagement with the lock release member 46 and the parts are positioned as shown in FIG. 5(B). In this position, the lock release member 46 in the form of a thin leaf spring is pressed against the lateral edge 51g of the bent bar 51e. The diskette 1 is now in the drive position with the sector hole 3a (FIG. 1) positioned substantially directly above the spindle 15.

After the diskette 1 has been inserted into the drive position, the finger grip 33b of the actuator 33 is depressed to turn the actuator 33 and the hub frame 31 in the direction of the arrow B. As shown in FIGS. 3(B) and 4, the lateral pins 35 of the actuator 33 are engaged by the lower edge of the guide rib 12f, whereupon the hub frame 31 is locked in position. The hub clamp 37 on the hub frame 31 is inserted into the sector hole 3a in the storage medium 3, and a peripheral edge around the sector hole 3a is clamped between the spindle 15 and the hub clamp 37 under the resilient force from the coil spring acting between the hub clamp 37 and the hub frame 31. With the actuator 33 lowered in the locked position, the front bent portion 33a thereof closes off the insertion slot 12a.

When the hub frame 31 descends in the direction of the arrow B, the lefthand ends of the arms 41a of the auxiliary frame 41 move away from the stopper rib 12g, and the auxiliary frame 41 is now released of engagement with the stopper rib 12g, whereupon the auxiliary frame 41 is brought into close contact with the hub frame 31 under the bias of the coil spring interposed between the hub frame 31 and the hub clamp 37 as illustrated in FIG. 3(B). This allows the actuation member 45 secured to the righthand end of the auxiliary frame 41 to move down closely toward the base 11. As a consequence, the pad arm 25 which has been raised by the arm 45a of the actuation member 45 is lowered to enable the pad 26 to hold the storage medium 3 against the magnetic head 21 under the force of the spring which urges the pad arm 25.

The downward movement of the frame 31 causes the lock release member 46 attached to the arm 45b to be lowered also. The lock release member 46 thus slidably moves out of pressed contact with the lateral edge 51 of the ejector bar 51e into fitting engagement in the lateral recess 51f in the bar 51e under the resiliency of the lock release member 46 itself, as shown in FIG. 5(C).

While the magnetic disk drive assembly is in the drive position with the hub frame 31 lowered, information can be written into or read out of the diskette 1. More specifically, the flywheel 17 is rotated by the motor 19 (FIG. 2) which is energized to thereby rotate the spindle 15. The storage medium 3 which is clamped between the spindle 15 and the hub clamp 37 is rotated within the jacket 2, and the magnetic head 22 writes information into or reads information out of the rotating storage medium 37 while in contact therewith. During this time, the head base 22 is driven by the stepping motor (not shown) to move along the guide rail 23 (FIG. 2) on the base 11 in the radial direction of the storage medium 3.

After information has been written into or read out of the diskette 1, the latter can be ejected in a single operation by pushing the finger grip 33b of the actuator 33 into the drive assembly in the direction of the arrow D. When the finger grip 33b is pushed inwardly, the lateral pins 35 on the actuator 33 are disengaged from the lower edge F of the guide rib 12f (FIG. 4). The hub frame 31 is angularly moved upwardly under the force of the leaf springs 32 back to the position of FIG. 3(A), in which the hub clamp 37 is disengaged from the spindle 15 and the pad 26 is disengaged from the storage medium 3 to free the diskette 1.

Simuntaneously, the lock release member 46 attached to the actuation member 45 also moved upwardly with the hub frame 31. Since the lock release member 46 is fitted in the recess 51f in the ejector bar 51e, the ejector 51 is also raised with the lock release member 46 away from the base 11. As a result, the bent flange 51d of the ejector 51 is disengaged from the locking projection 11c, whereupon the ejector 51 is allowed to ride over the locking projection 11c under the resiliency of the spring 53 and swings in the direction of the arrow G until the ejector 51 hits the stopper 11b. As the ejector 51 is thus turned back, the protective strip 54 on the ejector 51 pushes the front edge 1a of the diskette 1 back to the insertion slot 12a for a distance large enough to cause a rear end of the diskette 1 to pop out of the insertion slot 12a. The rear end of the diskette 1 can now be gripped by fingers and taken out of the drive assembly.

While in the illustrated embodiment the ejector 51 is arranged to be lifted bodily with the upward movement of the lock release member 46, the ejector 51 may be comprised of a body angularly movable only along the upper surface of the base 11 and a separate member vertically movably mounted on the body and capable of fitting engagement with the lock release member 46, the separate member being lockable by the locking projection 11c. Furthermore, the ejector 51 may be constructed such that it can move toward and away from the insertion slot 12a in perpendicular relation thereto, and can be locked in a position remotely from the insertion slot 12a. The lock release member 46 may be directly mounted on the hub frame 31.

Although a certain preferred embodiment has been shown and described, it should be understood that many changes and modifications may be made therein without departing from the scope of the appended claims.

What is claimed is:

1. A magnetic disk drive assembly comprising:
   a base;
   a front panel rounted on said base at a front portion of said assembly and having an opening for insertion therethrough of a disk;
   a pair of side panels formed with said base and jointly defining a path of movement for a disk inserted in said front panel toward a rear portion of said assembly;
   a spindle mounted rotatably on a central portion of said base in said path of novement;
   a magnetic head mounted on said base and movable with respect to an inserted disk for writing information into and reading information out of the disk;
   a frame member pivotably mounted on said base for angular movement between a drive position horizontally over said spindle and a non-drive position pivoted angularly away from said spindle, said frame member supporting a hub pressable against said spindle for clamping the disk between said hub and said spindle in said drive position;
   an ejector positioned at said rear portion of said base and having a foot portion pivotally mounted to said base and engageable by a leading edge of an inserted disk for pivotal movement between an unlocked position in said path of movement and a locked position out of said path of movement when the disk is fully inserted in said disk drive assembly, a bar portion carried on an end of said ejector, and torsion means resiliently urging said ejector into said unlocked position when it is not in said locked position for ejecting the disk along said path of movement out of said disk drive assembly and pivotally returning said foot portion into said path of movement so as to be engageable with the leading edge of a disk;
   a locking body comprising a projection for locking said ejector in said locked position, said ejector having an engaging portion adapted to ride over and be retained by said projection when said foot portion of said ejector is engaged by the leading edge of a disk fully inserted in said disk drive assembly; and a lock release member comprising a leaf spring mounted on said frame member at the rear portion of said disk drive assembly and resiliently engageable with a recess in said bar portion of said ejector in said locked position when said frame member is moved to said drive position, said ejector being releasable from said locked position toward said unlocked position when said frame member is moved from said drive position to said non-drive position by said lock release member lifting said engaging portion of said ejector over said projection.

2. An assembly according to claim 1, a carriage movable beneath said disk and carrying a read/write head, an arm member located above said carriage and urged resiliently toward said head for holding said head and disk in engagement, and means carried by said frame member and engaging said arm member for moving said arm member away from said carriage by movement of said frame member from said drive to said non-drive position.

3. An assembly according to claim 1, said frame member carrying an auxiliary frame connected pivotally thereto and having a forward portion adapted to engage a rib portion of said front panel for pivoting said auxiliary frame during movement of said frame member between said drive position and said non-drive position, said hub including a central shaft carried by said auxiliary frame, said hub being urged resiliently away from said auxiliary frame, said auxiliary frame being pivoted relative said frame member at a position forward of said shaft for raising said shaft to maintain said hub generally parallel to said path of movement as said frame member is moved between said drive position and said non-drive position.

4. An assembly according to claim 3, wherein said lock release member is mounted to a rearward portion of said auxiliary frame extending toward the rear portion of said assembly.

5. An assembly according to claim 1, said torsion means including an elongate resilient member coiled loosely about a pivot pin on which said ejector is mounted to bias said ejector downwardly towards said base but to enable it to be lifted over said projection.

6. A magnetic disk drive assembly comprising:

a base;

a front panel mounted on said base at a front portion of said assembly and having an opening for insertion therethrough of a disk;

a pair of side panels formed with said base and jointly defining a path of movement for a disk inserted in said front panel toward a rear portion of said assembly;

a spindle mounted rotatably on a central portion of said base in said path of movement;

a magnetic head mounted on said base and movable with respect to an inserted disk for writing information into and reading information out of the disk;

a frame member pivotably mounted on said base for angular movement between a drive position horizontally over said spindle and a non-drive position pivoted angularly away from said spindle, said frame member supporting a hub pressable against said spindle for clamping the disk between said hub and said spindle in said drive position;

an ejector positioned at said rear portion of said base and having a foot portion pivotally mounted to said base and engageable by a leading edge of an inserted disk for pivotal movement between an unlocked position in said path of movement and a locked position out of said path of movement when the disk is fully inserted in said disk drive assembly, a bar portion carried on an end of said ejector, and torsion means resiliently urging said ejector into said unlocked position when it is not in said locked position for ejecting the disk along said path of movement out of said disk drive assembly and pivotally returning said foot portion into said path of movement so as to be engageable with the leading edge of a disk;

a locking body comprising a projection for locking said ejector in said locked position, said ejector having an engaging portion adapted to ride over and be retained by said projection when said foot portion of said ejector is engaged by the leading edge of a disk fully inserted in said disk drive assembly, wherein said torsion means biases said ejector toward said base and said engaging portion includes a hole in said ejector into which said projection is retained when said ejector is in said locked position; and a lock release member mounted on said frame member at the rear portion of said disk drive assembly and engageable with said bar portion of said ejector in said locked position when said frame member is moved to said drive position, said ejector being releasable from said locked position toward said unlocked position when said frame member is moved from said drive position to said non-drive position by said lock release member lifting said engaging portion of said ejector over said projection.

* * * * *